A. H. FOX.
VEHICLE SPRING.
APPLICATION FILED JULY 5, 1913.
1,105,971.
Patented Aug. 4, 1914.
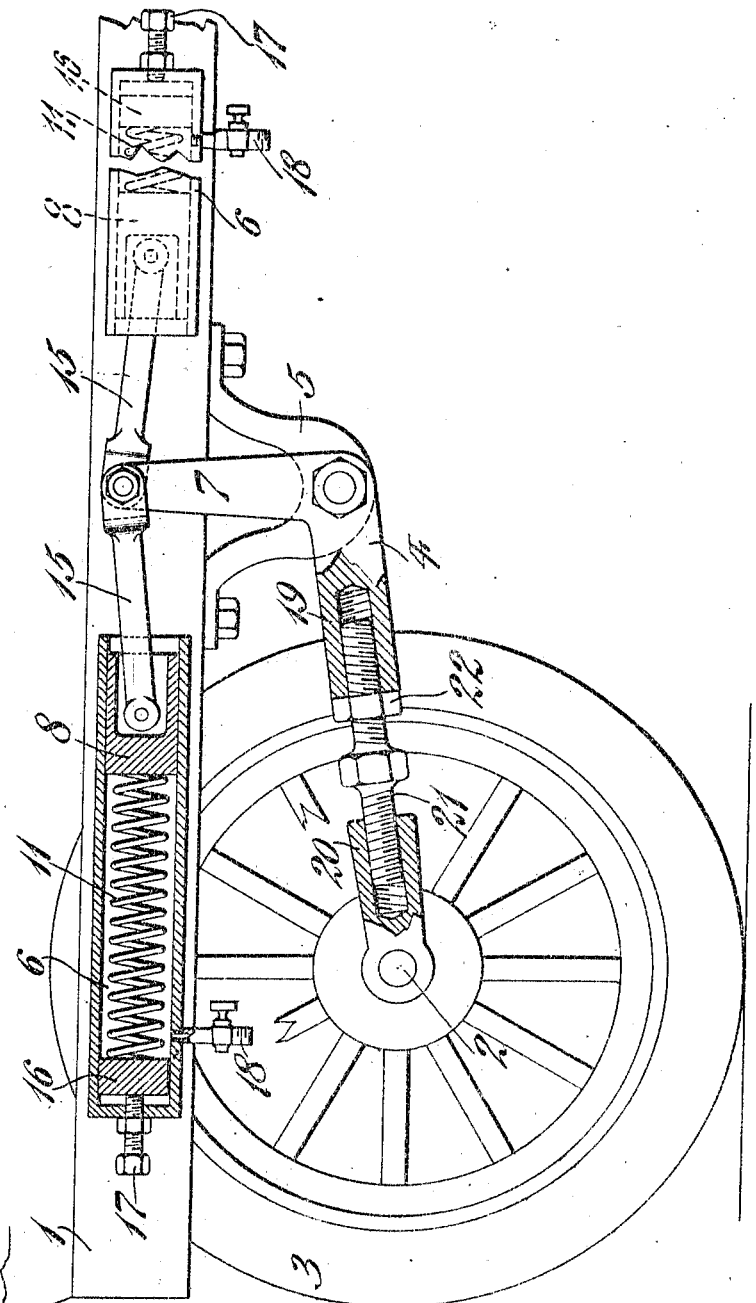
WITNESSES
INVENTOR
Ansley H. Fox.
BY
Wiedersheim & Fairbanks
ATTORNEYS

UNITED STATES PATENT OFFICE.

ANSLEY H. FOX, OF PHILADELPHIA, PENNSYLVANIA, ASSIGNOR, BY DIRECT AND MESNE ASSIGNMENTS, TO AUTOMOBILE DEVELOPMENT COMPANY, A CORPORATION OF DELAWARE.

VEHICLE-SPRING.

1,105,971.

Specification of Letters Patent.

Patented Aug. 4, 1914.

Application filed July 5, 1913. Serial No. 777,519.

*To all whom it may concern:*

Be it known that I, ANSLEY H. FOX, a citizen of the United States, residing in the city and county of Philadelphia, State of Pennsylvania, have invented a new and useful Vehicle-Spring, of which the following is a specification.

My invention consists of an improved spring or cushioning device for vehicle axles, in which the cushioning action is effected by the combined action of air and springs.

It further consists in such a device in which the cushioning action is effected by oppositely acting cushion-devices acting upon levers in which the axle of the vehicle is mounted.

It further consists of other novel features of construction, all as will be hereinafter fully set forth.

The annexed drawing and the following description set forth in detail one mechanical form embodying the invention, such detail construction being but one of various mechanical forms in which the principle of the invention may be used.

The figure represents a side elevation, partly in section, of a device embodying my invention and as much of an automobile as will illustrate the application of the device.

Referring to the drawings, the reference numeral 1 indicates the bed-frame or chassis of an automobile, having a rear axle, 2, carrying wheels, 3. The rear or driving axle is journaled in the members 4 (the construction of which is hereinafter described) of angular levers which are fulcrumed at their elbows in the brackets 5 upon the chassis. Cylinders 6 are secured upon the side of the chassis, 2, at opposite sides of the upwardly projecting arms 7 of the angular levers, and are provided with the plungers 8, fitted to slide in the open ends of said cylinders. I provide the connecting rods, 15, which are pivotally connected with the plungers 8 and also with the upwardly projecting arms 7 of the angular levers. I likewise provide within the cylinders 6, the springs 11, which bear against the plungers and also against the movable blocks, 16, preferably situated at the inner end of the cylinders, and which are adjustable in their position by means of set screws, 17, so that the tension of said springs may be adjusted. Air control in the cylinders is accomplished by means of a cock 18, of any suitable or desired construction, by means of which it is possible that air pressure in the said cylinders may be varied, as desired. As the vehicle travels over the ground, the chassis and body is suspended upon the rear axle by the angular levers, the yielding plungers act against the arms of the same, and the air-cushions within the cylinders, cushioning the movements of the axle and wheels. The amount of resistance in the cushion cylinders can be regulated by means of the needle-valves, permitting more or less escape of air according to adjustment, and release of pressure in one cylinder will admit of the spring in the opposite cylinder causing the plunger to follow the lever-arm and be ready to resume its action. The cushioning action of the device will be effective in both upward and downward movement of the axle and wheel, and perfect cushioning of the axle will obtain. The member 4, as shown, is formed, in the present instance, of the threaded sockets 19 and 20, which are suitably connected by means of a rod, shown as an adjustment screw 21, provided with right and left hand screw threads, these parts forming a rigid member. By reason of which construction, I have provided means for allowing lateral movement of the shaft 2, with respect to the point of support of said angular levers, and whereby the position of the axle with respect to the pivotal point of support of the said angular levers may be adjusted. As here shown, the socket 20 of the member 4, is suitably connected with the vehicle axle 2. It will thus be apparent that by reason of the connecting rod or screw 21 being in adjustable and rotatable engagement with the sockets and extending longitudinally thereof, that the said rod permits of adjustment of the length of the member 4 between the axle and the fulcrum of the angular lever. I further provide a lock nut 22 for locking the parts in their adjusted position longitudinally, so that while the connecting rod or screw 21 is locked with respect to one of the sockets, for example, the socket 19, a certain amount of rotation or relative swiveled motion between the other socket, as 20, and the said rod may occur, whereby either end of the axle 2 is permitted to raise or lower independently of the other, on either side of the vehicle.

Other modes of applying the principle of my invention may be employed for the mode herein explained. Change may therefore be made as regards the mechanism thus disclosed provided the principles of construction set forth respectively in the following claims are employed.

Having thus described my invention what I claim as new and desire to secure by Letters Patent, is:—

1. In a device of the character stated, a lever in the end of one arm of which a vehicle axle can be supported and adapted to be fulcrumed upon the vehicle frame, cylinders upon the opposite sides of the other arm of said lever, a plunger in each cylinder, a connecting rod pivoted at one end to a plunger in its respective cylinder and the opposite end of each rod pivoted to the said other arm of said lever, and a cushioning device adapted to bear against each plunger, said devices operating in opposite directions, whereby the cushioning action is exerted upon the other arm of said lever through the medium of said plunger and said rods.

2. In a device of the character stated, an elbow lever adapted to be fulcrumed upon the vehicle frame, cushioning devices acting against one arm of said lever in opposite directions, a socket on the other arm of said lever, a socket adapted to be suitably connected with the vehicle axle, a connecting rod in adjustable and rotatable engagement with said sockets and extending longitudinally thereof, said sockets, rod and arm forming a rigid member, and said rod serving for adjustment of the length of the member between the axle and fulcrum of said lever, and a lock, for said rod and one of said sockets, for preventing rotation of said rod, and so that relative swiveled motion between the other socket and the rod may occur, whereby either end of the axle is permitted to raise or lower independently of the other, on either side of the vehicle.

ANSLEY H. FOX.

Witnesses:
C. D. McVay,
M. E. Byrne.